(12) United States Patent
Rich

(10) Patent No.: US 12,064,714 B1
(45) Date of Patent: Aug. 20, 2024

(54) SAND DRYING SYSTEM AND METHOD OF USE

(71) Applicant: Thomas Jason Rich, Midland, TX (US)

(72) Inventor: Thomas Jason Rich, Midland, TX (US)

( * ) Notice: Subject to any disclaimer, the term of this patent is extended or adjusted under 35 U.S.C. 154(b) by 0 days.

(21) Appl. No.: 17/378,355

(22) Filed: Jul. 16, 2021

Related U.S. Application Data

(60) Provisional application No. 63/052,843, filed on Jul. 16, 2020.

(51) Int. Cl.
*B01D 21/24* (2006.01)
*F26B 17/22* (2006.01)

(52) U.S. Cl.
CPC .......... *B01D 21/2461* (2013.01); *F26B 17/22* (2013.01); *F26B 2200/14* (2013.01)

(58) Field of Classification Search
CPC ... B01D 21/2461; F26B 17/22; F26B 2200/14
See application file for complete search history.

(56) References Cited

U.S. PATENT DOCUMENTS

| 4,274,963 | A * | 6/1981 | Purvis | B01D 21/2461 |
| | | | | 210/523 |
| 10,399,029 | B1 * | 9/2019 | Hiracheta | B01D 19/0052 |
| 2011/0265993 | A1 * | 11/2011 | Williams | B01D 21/2461 |
| | | | | 166/267 |
| 2014/0083957 | A1 * | 3/2014 | DeWaard | B65G 33/12 |
| | | | | 210/194 |
| 2019/0143380 | A1 * | 5/2019 | Davis | B08B 9/093 |
| | | | | 134/65 |

OTHER PUBLICATIONS

Definition of shoot and chute (Year: None).*

* cited by examiner

*Primary Examiner* — Liam Royce
(74) *Attorney, Agent, or Firm* — Richard G. Eldredge; Leavitt Eldredge Law Firm

(57) ABSTRACT

Sand and liquid that are stored within a hopper are pulled together along a trough by a set of discs that are attached to and rotate about a shaft. The trough is configured to allow the liquid to flow downwards as the sand is compacted and elevated. The discs conform to a part of the surface of the trough with enough space to allow the liquid to flow around it. This allows dry sand to exit the trough and retains the liquid in the hopper. The discs are rotated on the shaft by a belt and motor.

1 Claim, 6 Drawing Sheets

SAND DRYING SYSTEM AND METHOD OF USE

BACKGROUND

1. Field of the Invention

The present invention relates generally to sand, water, and gas separators and methods of use.

2. Description of Related Art

Separators configured to separate sand from water are well known in the art and are effective means to remove sand and/or other debris from a liquid. For example, FIG. 1 illustrates a front view of a conventional separator 101 having a housing 103 configured to receive a mix of sand and water 105 therein. An auger screw 107 is partially disposed within the sand and water mix and has a plurality of blades 111 configured to traverses the sand and water mix along an inclined section 109 of housing 103. During use, the auger screw 107 rotates, which in turn causes an upward angled movement of the sand and water mix along the inclined section 109. The water gradually recedes along the inclined section while the sand and/or other forms of debris exits from housing 103 via auger screw 107.

It will be appreciated that the separator 101 is effective in most scenarios; however, the separator 101 has limitations. For example, the separator 101 is not effective in separating small, fine materials from the sand and water mix 105. The separator 101 is primarily utilized to remove larger-sized particles.

Accordingly, although great strides have been made in the area of separator systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
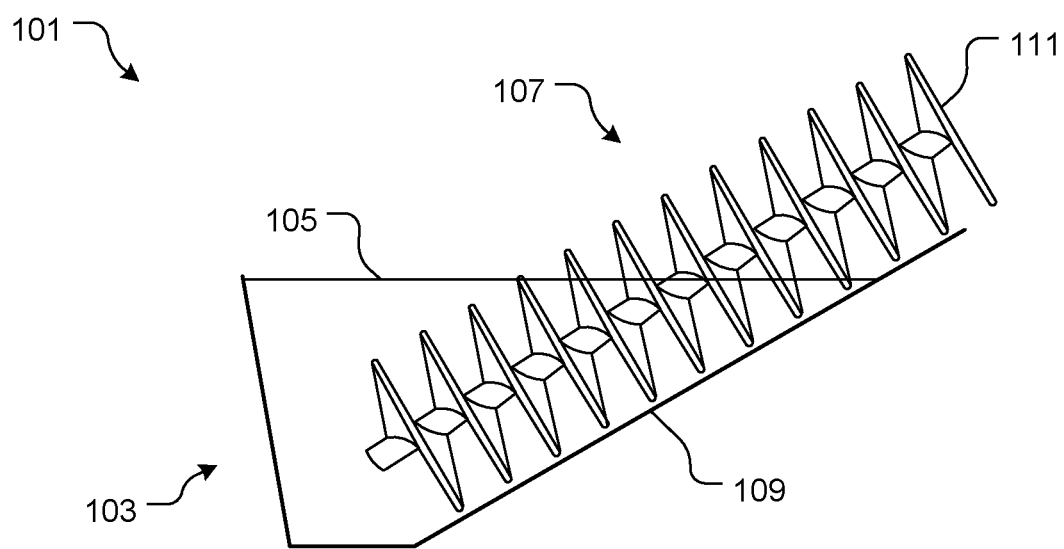
FIG. 1 is a side view of a conventional separator.

While the separator system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the separator system and method of use of the present application are provided below. It will of course be appreciated that in the development of any actual embodiment, numerous implementation-specific decisions will be made to achieve the developer's specific goals, such as compliance with sand drying system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The separator system and method of use will be understood, both as to its structure and operation, from the accompanying drawings, taken in conjunction with the accompanying description. Several embodiments of the sand drying system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
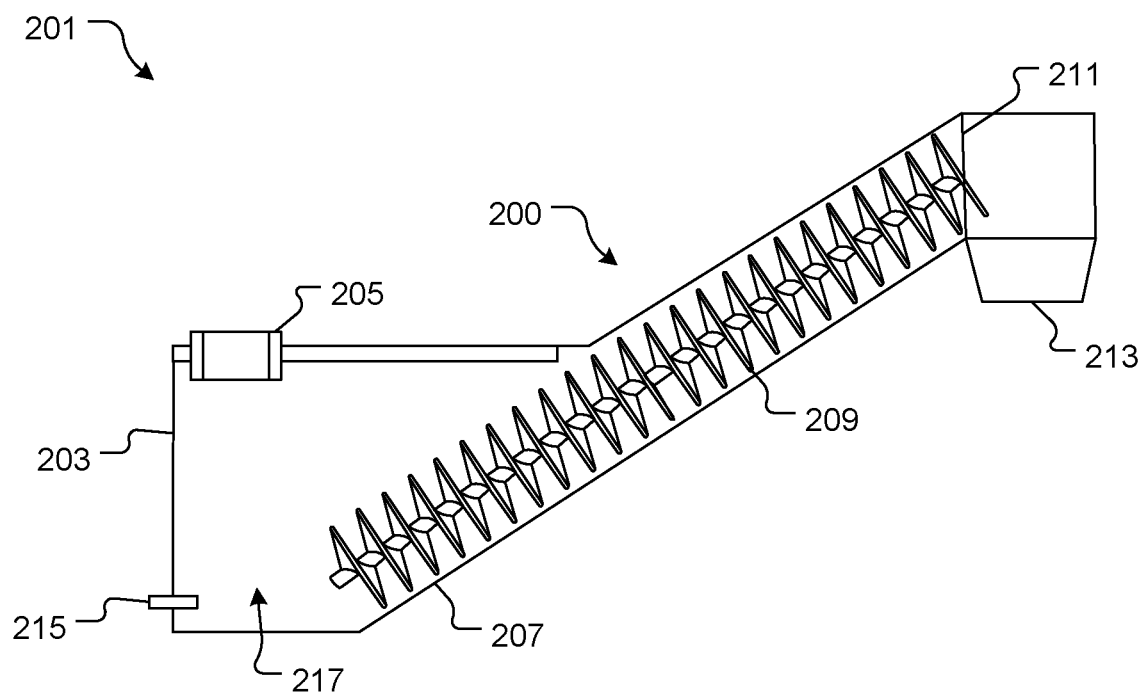
FIG. 2 is a side view of a sand drying system in accordance with a preferred embodiment of the present application.

Referring now to the drawings wherein like reference characters identify corresponding or similar elements throughout the several views, FIG. 2 depicts a side views of the sand drying system 201 in accordance with a preferred embodiment of the present application. It will be appreciated that the system 201 overcomes one or more of the above-listed problems commonly associated with conventional sand dryers. A detailed explanation of these differences and unique features of the system 201 are discussed below with reference to the accompanying drawings.

System 201 includes one or more of a portable hopper 200 having a body 203 that encloses a space 217. An opening 205 is attached to the top thereof and allows a mixture of sand and liquid to enter the space 217. A disc assembly 209 is arranged within an angled trough 207 that leads to an exit 211 and a shoot 213. A drain 215 is in fluid communication with the space 217 and is configured to allow liquid to exit therefrom.

Figure 3:
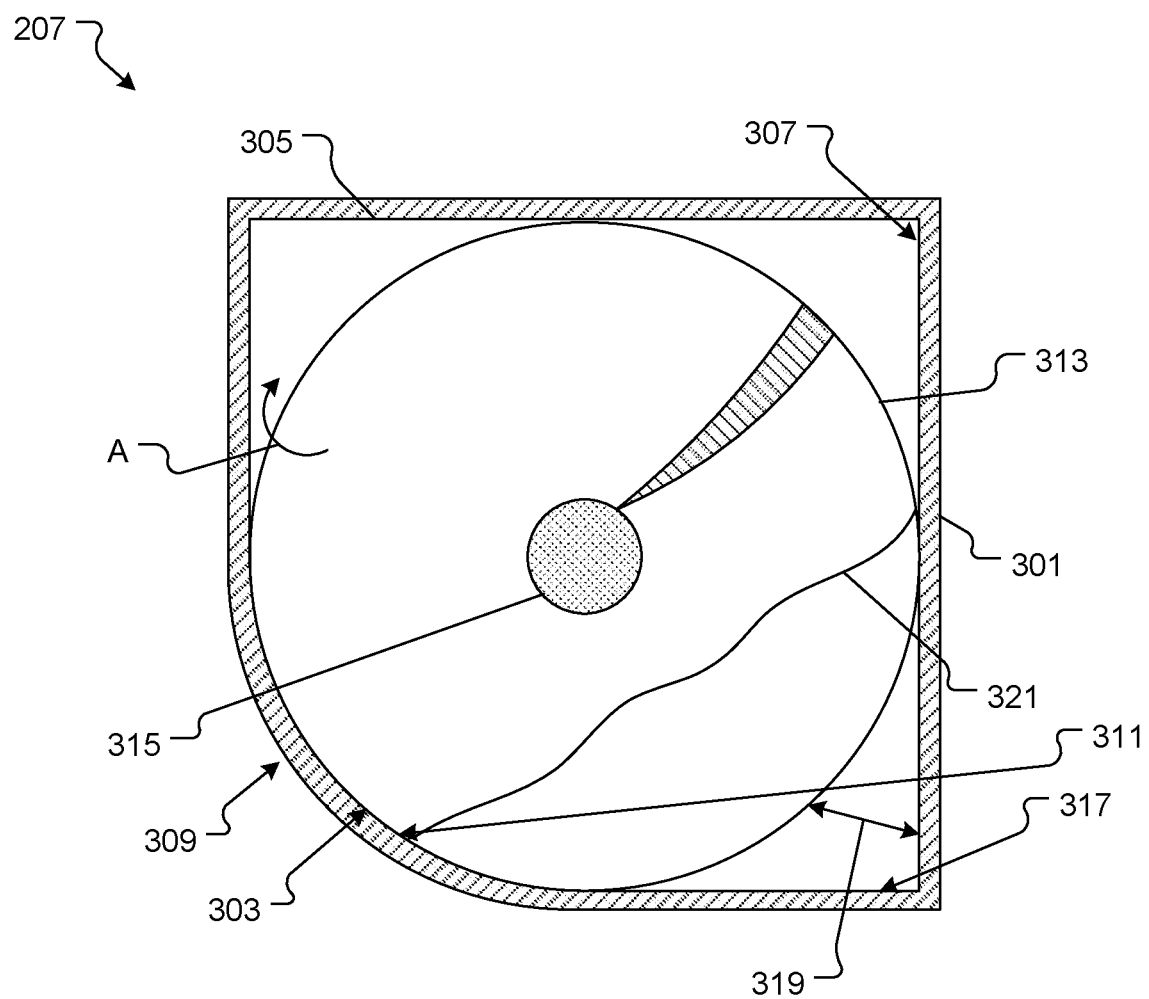
FIG. 3 is a cross-sectional front view of the separator of FIG. 2 during use.

The angled trough 207 as depicted in FIG. 3 includes an outer body 301 that has a passageway 303 therein. The inner surface 307 of passageway 303 has a generally rectangular cross-section along its length and is rounded at one lower corner 309. The disc assembly 209 is sized to fit the rounded corner surface 311 so that the edge 313 of each disc 315 nest therein so that about % of the edge 313 of each disc is close to or follows the contour of the passageway 303 at the rounded corner surface 311 as it rotates in the passageway 303. The opposite corner 317 provides a gap 319 between the edge 313 and the passageway 303 that is in fluid communication with the space 217. In the preferred embodiment, the sand and liquid mixture 321 partially fills the trough 207.

It is contemplated and will be understood that the diameter of the discs 315 affects the amount of sand that passes through the trough. Likewise, the speed of rotation of the disc assembly 209 affects the amount of sand that passes through the trough. It is contemplated that larger diameter discs allow for a lower rotation speed to move the same volume of material.

When the discs 315 of the disc assembly 209 rotate, sand and liquid from the space 217 are pulled up through the angled trough 207 thereby. The sand is compacted or compressed so that the liquid is forced out. The liquid flows as depicted by motion A back down towards the space 217 of the hopper 200 as facilitated by the gaps 319 between the discs 315 and the inner surface 307.

Figure 4:
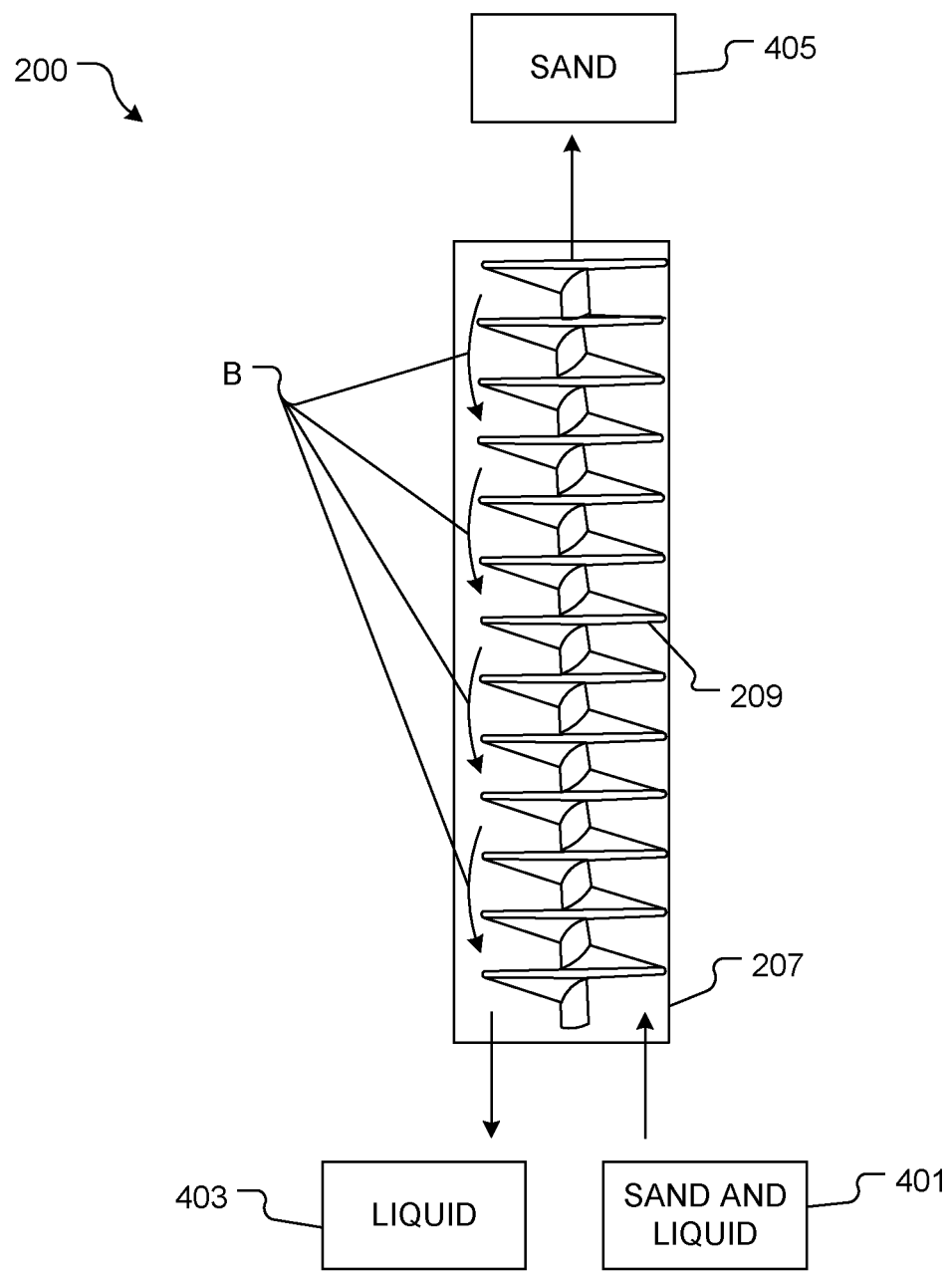
FIG. 4 is a top view of the trough and disc assembly of FIG. 2.

In use, as depicted by FIG. 4 sand and liquid 401 are pulled in trough 207 by the disc assembly 209. The rotation of the disc assembly 209 causes the liquid 403 to separate from the sand 405 and to fall back down to the space 217 as depicted by motion B. The sand 405 continues up the angled trough 207 to the exit 211 and the shoot 213 the sand 405 then collects.

One of the unique features believed characteristic of the present application is the configuration of the angled trough 207 that allows for the fluid to be removed from the sand 311 without the use of chemicals or evaporators. It will further be appreciated that the sand/liquid mixture must be removed and that the work done during that removal now also separates the liquid from the sand 311.

Figure 5:
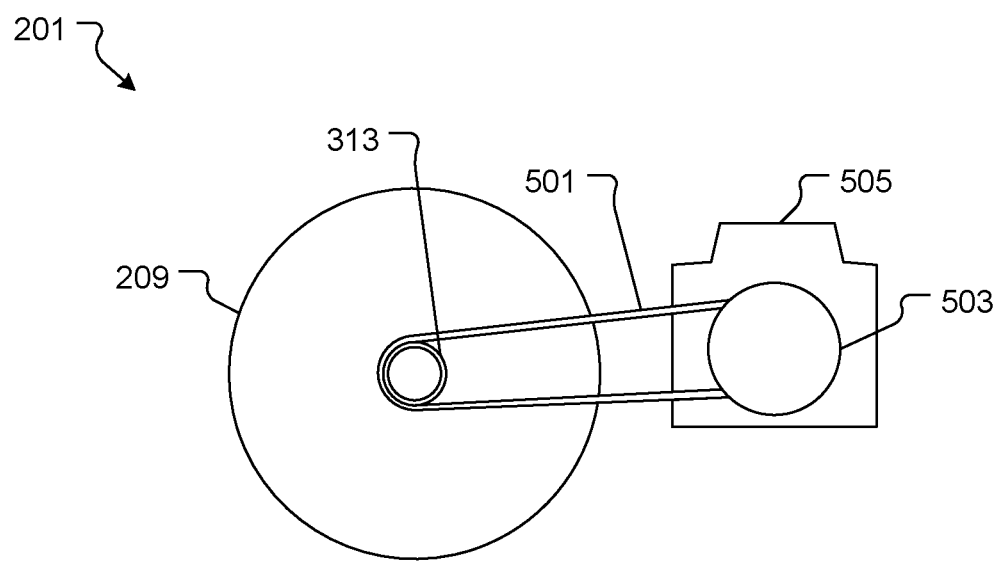
FIG. 5 is a cross-sectional front view of the separator of FIG. 2.

In the preferred embodiment as depicted by FIG. 5, it is contemplated that shaft 313 is driven by a belt 501 and pulley 503 arrangement that is in turn operated by a motor 505. In use, should the disc assembly foul, the belt will, by nature, disconnect from the shaft 313 without damage to the motor 505 or the shaft 313. It will be appreciated that repair work to the disc assembly, shaft, or motor is simplified by not requiring the physical disconnection of the shaft 313 and motor 505. Further, damage to the shaft 313 or motor is avoided when the belt is allowed to disconnect when fouling occurs.

Figure 6:
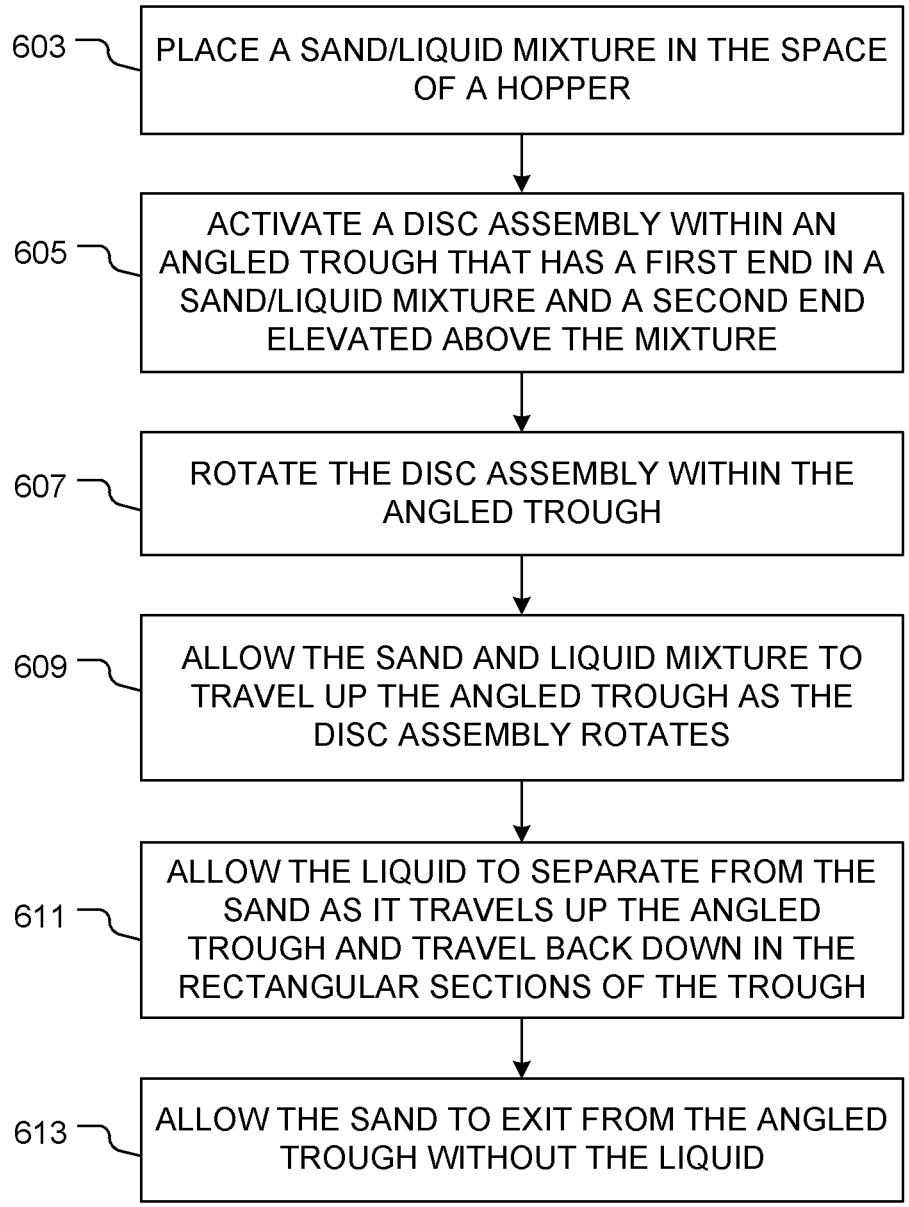
FIG. 6 is a flowchart of a method of removing liquid from a sand mixture.

Referring now to FIG. 6 a method of separating sand from a liquid is depicted. Method 601 includes placing a sand/liquid mixture in a space of a hopper 603, activating a disc assembly within an angled trough that has a first end in a sand/liquid mixture and a second end elevated above the mixture 605, rotating the disc assembly within the angled trough 607, allowing the sand/liquid mixture to travel up the angled trough as the disc assembly rotates 609, allowing the liquid to separate from the sand as it travels up the angled trough and travel back down in the rectangular sections of thereof 611, and allowing the sand to exit the angled trough without the liquid 613.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A separator system comprising:
   a portable hopper;
   a trough attached to and extending from an angle relative to the portable hopper, the trough having:
     a body with a rectangular shape that forms a passageway, wherein one corner of the body is rounded with a first radius;
   a disc assembly that includes a plurality of discs attached to a shaft, the disc assembly passes through the passageway formed by the body, the plurality of discs are sized such that an edge of each disc nest in the rounded corner; and
   at least one motor attached to the shaft via a belt or chain;
   wherein the disc assembly is within the angled trough with a lower end in the hopper and an upper end adjacent the chute;
   wherein a sand and liquid mixture is stored within the hopper and as the disc assembly rotates via the motor the mixture is pulled up and through the angled trough a motion of the discs within the angled trough separates the liquid from the sand;
   wherein water from the sand and liquid mixture passes through a gap created by the body and the plurality of discs.

* * * * *